(12) United States Patent
Chen et al.

(10) Patent No.: US 12,439,456 B2
(45) Date of Patent: Oct. 7, 2025

(54) METHOD FOR TRANSMITTING RANDOM ACCESS MESSAGE AND DEVICE

(71) Applicant: VIVO MOBILE COMMUNICATION CO., LTD., Guangdong (CN)

(72) Inventors: Xiaohang Chen, Guangdong (CN); Xiaodong Shen, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 642 days.

(21) Appl. No.: 17/389,475

(22) Filed: Jul. 30, 2021

(65) Prior Publication Data

US 2021/0360707 A1 Nov. 18, 2021

Related U.S. Application Data

(63) Continuation of application No. PCT/CN2020/071731, filed on Jan. 13, 2020.

(30) Foreign Application Priority Data

Feb. 1, 2019 (CN) .......................... 201910105105.6

(51) Int. Cl.
*H04W 74/08* (2024.01)
*H04L 5/14* (2006.01)
*H04W 56/00* (2009.01)
*H04W 74/0833* (2024.01)

(52) U.S. Cl.
CPC ....... *H04W 74/0841* (2013.01); *H04L 5/1469* (2013.01); *H04W 56/001* (2013.01)

(58) Field of Classification Search
CPC ............ H04W 56/001; H04W 74/0841; H04L 5/1469; H04L 5/1469
See application file for complete search history.

(56) References Cited

U.S. PATENT DOCUMENTS

| | | | |
|---|---|---|---|
| 2018/0077696 A1 | 3/2018 | Lee et al. | |
| 2018/0192300 A1 | 7/2018 | Kazmi et al. | |
| 2018/0220450 A1* | 8/2018 | Aiba | H04W 72/0446 |
| 2018/0263063 A1 | 9/2018 | Islam et al. | |
| 2018/0270722 A1 | 9/2018 | Kim et al. | |
| 2019/0014601 A1 | 1/2019 | Kim et al. | |

(Continued)

FOREIGN PATENT DOCUMENTS

| | | |
|---|---|---|
| CN | 108141856 A | 6/2018 |
| CN | 108476539 A | 8/2018 |
| JP | 2018533242 A | 11/2018 |

OTHER PUBLICATIONS

Ericsson, "Summary of Physical random access channel and procedure", 3GPP TSG-RAN WG1 Meeting #95, R1-1814166, Spokane, WA, USA, Nov. 12-16, 2018.

(Continued)

*Primary Examiner* — Sulaiman Nooristany
(74) *Attorney, Agent, or Firm* — Price Heneveld LLP

(57) ABSTRACT

A method for transmitting a random access message and a device are provided. The method includes: determining a valid transmission occasion from transmission occasions of a random access message, where the random access message corresponds to at least one of physical random access channel (PRACH) or physical uplink shared channel (PUSCH); and transmitting the random access message on the valid transmission occasion.

12 Claims, 5 Drawing Sheets

(56) References Cited

U.S. PATENT DOCUMENTS

| | | | |
|---|---|---|---|
| 2019/0349180 A1* | 11/2019 | Lu | H04L 27/2607 |
| 2021/0029737 A1* | 1/2021 | Pan | H04W 74/002 |
| 2021/0321463 A1* | 10/2021 | Wu | H04W 56/0015 |
| 2021/0329704 A1* | 10/2021 | Yang | H04L 5/001 |
| 2022/0110136 A1* | 4/2022 | Li | H04W 92/20 |

OTHER PUBLICATIONS

Ericsson, "Summary of Physical random access channel and procedure", 3GPP TSG-RAN WG1 Meeting #95, R1-1813856, Spokane, WA, USA, Nov. 12-16, 2018.

Nokia, "Remaining details on NR Random Access", 3GPP TSG-RAN WG1#94bis, R1-1813154, Spokane, USA, Nov. 12-16, 2018.

"3rd Generation Partnership Project; Technical Specification Group Radio Access Network; NR; Physical layer procedures for control (Release 15)", 3GPP TS 38.213 V15.3.0 (Sep. 2018), Valbonne, France.

OPPO, "Discussion of synchronization mechanism for NR-V2X", 3GPP TSG RAN WG1 Meeting #95, R1-1812812, Spokane, USA, Nov. 12-16, 2018.

Ericsson, "Maintenance for physical random access channel and procedure", 3GPP TSG-RAN WG1 Meeting #94, R1-1809257, Gothenburg, Sweden, Aug. 20-24, 2018.

Nokia, "On 2-step Random Access Procedure", 3GPP TSG RAN WG1 Ad-Hoc Meeting 1901, R1-1901192, Taipei, Taiwan, Jan. 21-25, 2019.

Convida Wireless, "Summary of Remaining details on PRACH formats", 3GPP TSG RAN WG1 Meeting #91, R1-1721639, Reno, USA, Nov. 27-Dec. 1, 2017.

"3rd Generation Partnership Project; Technical Specification Group Radio Access Network; NR; Physical layer procedures for control (Release 15)", 3GPP TS 38.213 V15.4.0 (Dec. 2018), Valbonne, France.

* cited by examiner

METHOD FOR TRANSMITTING RANDOM ACCESS MESSAGE AND DEVICE

CROSS-REFERENCE TO RELATED APPLICATIONS

This application is continuation application of PCT International Application No. PCT/CN2020/071731 filed on Jan. 13, 2020, which claims priority to Chinese Patent Application No. 201910105105.6, filed in China on Feb. 1, 2019, the disclosures of which are incorporated herein by reference in their entireties.

TECHNICAL FIELD

Embodiments of this disclosure relate to the communications field, and in particular, to a method for transmitting a random access message and a device.

BACKGROUND

In related technologies, random access procedures can be divided into 4-step random access and 2-step random access. In the 2-step random access procedure, a terminal device first transmits a random access message to a network device. However, the random access message may conflict with downlink data. If the terminal device transmits a random access message at a transmission occasion on which a conflict may occur, this may cause interference to downlink data transmission of the network device, and may also affect downlink data reception of the terminal device.

SUMMARY

Objectives of embodiments of this disclosure are to provide a method for transmitting a random access message and a device.

According to a first aspect, a method for transmitting a random access message is provided. The method is executed by a terminal device and includes: determining a valid transmission occasion from transmission occasions of a random access message, where the random access message corresponds to at least one of physical random access channel (PRACH) or physical uplink shared channel (PUSCH); and transmitting the random access message on the valid transmission occasion.

According to a second aspect, a terminal device is provided, including: a valid transmission occasion determining module, configured to determine a valid transmission occasion from transmission occasions of a random access message, where the random access message corresponds to at least one of PRACH or PUSCH; and a transmission module, configured to transmit the random access message on the valid transmission occasion.

According to a third aspect, a terminal device is provided, including: a processor, a memory, and a program stored in the memory and capable of running on the processor, where when the program is executed by the processor, the steps of the method for transmitting a random access message according to the first aspect are implemented.

According to a fourth aspect, a computer-readable storage medium is provided, where the computer-readable storage medium stores a computer program, and when the computer program is executed by a processor, the steps of the method for transmitting a random access message according to the first aspect are implemented.

BRIEF DESCRIPTION OF DRAWINGS

The drawings described herein are intended for a further understanding of this disclosure and constitute a part of this disclosure. Example embodiments of this disclosure and descriptions thereof are intended to explain this disclosure, and do not constitute any inappropriate limitation on this disclosure. In the accompanying drawings.

DESCRIPTION OF EMBODIMENTS

To make the objectives, technical solutions, and advantages of this disclosure clearer, the following clearly describes the technical solutions of this disclosure with reference to specific embodiments of this disclosure and corresponding drawings. Apparently, the described embodiments are merely some rather than all the embodiments of this disclosure. All other embodiments that a person of ordinary skill in the art obtains based on the embodiments of this disclosure shall fall within the protection scope of this disclosure.

It should be understood that the technical solutions in some embodiments of this disclosure can be applied to various communications systems such as long term evolution (LTE) time division duplex (TDD), 5G systems or new radio (NR) systems, or later evolved communications systems.

In some embodiments of this disclosure, a terminal device may include but is not limited to a mobile station (MS), a mobile terminal (Mobile Terminal), a mobile telephone, user equipment (UE), a handset, portable equipment, a vehicle, and the like. The terminal device may communicate with one or more core networks via a radio access network (RAN). For example, the terminal device may be a mobile phone (or referred to as a "cellular" phone), or a computer having a wireless communication function. The terminal device may alternatively be a portable, pocket-sized, handheld, computer built-in, or in-vehicle mobile apparatus.

Figure 1:
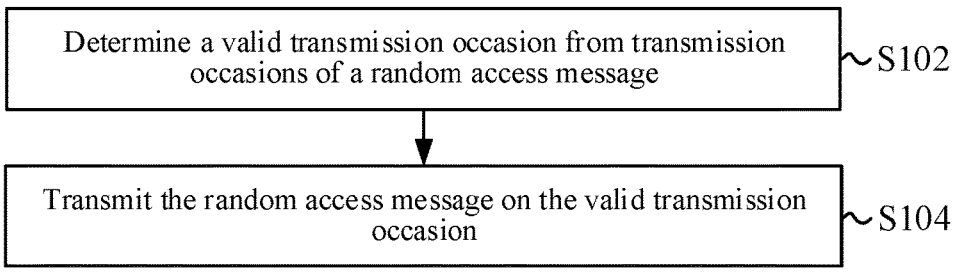
FIG. 1 is a schematic flowchart of a method for transmitting a random access message according to an embodiment of this disclosure.

As shown in FIG. 1, an embodiment of this disclosure provides a method 100 for transmitting a random access message. The method may be executed by a terminal device and includes the following steps.

S102: Determine a valid transmission occasion from transmission occasions of a random access message.

The random access message in various embodiments of this disclosure may correspond to at least one of physical random access channel (PRACH) or physical uplink shared channel (PUSCH). To be specific, the random access message corresponds to PRACH; or the random access message corresponds to PUSCH; or the random access message corresponds to PRACH and PUSCH.

In a 2-step random access procedure, a random access message transmitted by the terminal device corresponds to PRACH and PUSCH, meaning that the random access message is carried on PRACH and PUSCH.

In a case that the random access message corresponds to PRACH and PUSCH, a corresponding part of content of the random access message, for example, a preamble, may be transmitted on a PRACH; the other part of content of the random access message, for example, a terminal device identity or a temporary cell radio network temporary identifier TC-RNTI, may be transmitted on a PUSCH.

In a case that the random access message corresponds to at least one of PRACH or PUSCH, a transmission occasion of the random access message accordingly corresponds to at least one of a PRACH transmission occasion or a PUSCH transmission occasion. To be specific, if the random access message corresponds to PRACH, the transmission occasion of the random access message corresponds to a PRACH transmission occasion; or if the random access message corresponds to PUSCH, the transmission occasion of the random access message corresponds to a PUSCH transmission occasion; or if the random access message corresponds to PRACH and PUSCH, the transmission occasion of the random access message corresponds to a PRACH transmission occasion and a PUSCH transmission occasion.

In some embodiments of this disclosure, the terminal device may obtain, before transmitting a PUSCH corresponding to the random access message (MsgA for short), a PUSCH transmission occasion for the terminal device to transmit the PUSCH. The PUSCH transmission occasion may be pre-configured by a network device, and may include one or more orthogonal frequency division multiplexing (OFDM) symbols.

The PUSCH transmission occasion may also be associated with the PRACH transmission occasion. Specifically, one PUSCH transmission occasion may be associated with one PRACH transmission occasion, or one PUSCH transmission occasion can be associated with a plurality of PRACH transmission occasions, or a plurality of PUSCH transmission occasions may be associated with one PRACH transmission occasion, or a plurality of PUSCH transmission occasions may be associated with a plurality of PRACH transmission occasions, which is not specifically limited herein.

In some embodiments of this disclosure, the transmission occasion of the random access message may be configured through a broadcast message (for example, configured through a system information block (SIB) or a master information block (MIB)). Optionally, in an embodiment, the transmission occasion of the random access message is periodic.

Specifically, the determining a valid transmission occasion in step S102 can be determining whether a current transmission occasion is a valid transmission occasion; and if yes, proceeding to step S104; if no, continuing to determine whether a next transmission occasion is a valid occasion, and so on until a valid transmission occasion within one period is determined.

A criterion for determining a valid transmission occasion mentioned in the embodiments of this disclosure may specifically be: the transmission occasion is a valid transmission occasion provided that on the transmission occasion, transmission of the random access message does not conflict with downlink data, and does not interfere with normal transmission of the downlink data. Conversely, on an invalid transmission occasion, it is possible that transmission of the random access message conflicts with downlink data.

Specifically, in step S102, the valid transmission occasion may be determined from the transmission occasions of the random access message based on at least one of a slot format indicated in first configuration information, a slot format indicated in second configuration information, or a synchronization signal block (SSB) occasion (which may be an SSB transmission occasion or an SSB reception occasion), where the first configuration information includes cell-specific time division duplex (TDD) configuration information, and the second configuration information includes UE-specific TDD configuration information.

For example, in step S102, the valid transmission occasion is determined from the transmission occasions of the random access message based on a slot format indicated by first configuration information; or the valid transmission occasion is determined from the transmission occasions of the random access message based on a slot format indicated by second configuration information; or the valid transmission occasion is determined from the transmission occasions of the random access message based on an SSB occasion; or the valid transmission occasion is determined from the transmission occasions of the random access message based on a slot format indicated by first configuration information and a slot format indicated by second configuration information; or the valid transmission occasion is determined from the transmission occasions of the random access message based on a slot format indicated by first configuration information and an SSB occasion; or the valid transmission occasion is determined from the transmission occasions of the random access message based on a slot format indicated by second configuration information and an SSB occasion; or the valid transmission occasion is determined from the transmission occasions of the random access message based on a slot format indicated by first configuration information, a slot format indicated by second configuration information, and an SSB occasion.

S104: Transmit the random access message on the valid transmission occasion.

In the method for transmitting a random access message according to some embodiments of this disclosure, the valid transmission occasion is determined from the transmission occasions of the random access message. In this way, the random access message can be transmitted on the determined valid transmission occasion, thereby preventing transmission of the random access message from interfering with downlink data, and improving communication effectiveness.

Optionally, in an embodiment, the determining a valid transmission occasion from transmission occasions of a random access message mentioned in step S102 of the foregoing embodiment may specifically be: determining the valid transmission occasion from the transmission occasions of the random access message based on a slot format indicated by first configuration information. For example, if a transmission occasion of the random access message is located in an uplink symbol indicated by the first configuration information, it is determined that the transmission occasion is a valid transmission occasion, where the first configuration information includes cell-specific time division duplex (TDD) configuration information.

Optionally, in an embodiment, the determining a valid transmission occasion from transmission occasions of a random access message mentioned in step S102 of the foregoing embodiment may specifically be: if a transmission occasion of the random access message satisfies at least one of the following preset conditions, determining that the transmission occasion is a valid transmission occasion, where the first configuration information includes cell-specific TDD configuration information.

The preset conditions include:

(1) in one slot, the transmission occasion of the random access message does not precede an SSB occasion, which may specifically be that the transmission occasion follows the SSB occasion; or (2) a time gap between the transmission occasion of the random access message and a first preset occasion is greater than or equal to a first preset value, where the first preset occasion is a time domain location of a latest downlink symbol before the transmission occasion, with specific first preset values introduced in subsequent embodiments; or (3) a time gap between the transmission occasion of the random access message and a second preset occasion is greater than or equal to a first preset value, where the second preset occasion is a latest SSB occasion before the transmission occasion, where specifically, the second preset occasion may be a time domain location of the last symbol of SSB transmission or the last symbol of SSB reception.

The, if a transmission occasion of the random access message meets at least one of the preset conditions, determining that the transmission occasion is a valid transmission occasion, may specifically be: if the transmission occasion of the random access message is not located in an uplink symbol indicated by the first configuration information and meets at least one of the preset conditions, determining that the transmission occasion is a valid transmission occasion.

For TDD, a slot may include a downlink orthogonal frequency division multiplexing (OFDM) symbol, an uplink OFDM symbol, and a flexible OFDM symbol. Considering that it is impossible the transmission occasion of the random access message be located in a downlink symbol indicated by the first configuration information, that the transmission occasion of the random access message is not located in an uplink symbol indicated by the first configuration information may specifically be: the transmission occasion of the random access message is located in a flexible symbol indicated by the first configuration information.

Further optionally, the, if the transmission occasion of the random access message is not located in an uplink symbol indicated by the first configuration information and meets at least one of the preset conditions, determining that the transmission occasion is a valid transmission occasion includes: if the transmission occasion of the random access message is not located in an uplink symbol indicated by the first configuration information (which may specifically be located in a flexible symbol indicated by the first configuration information), and is located in an uplink symbol or a flexible symbol indicated by second configuration information, and meets at least one of the preset conditions, determining that the transmission occasion is a valid transmission occasion, where the second configuration information includes UE-specific TDD configuration information.

In a 5G system, if the terminal device or the network device runs in an unlicensed band, before transmitting a message, the terminal device or the network device needs to perform listen before talk (LBT). To be specific, clear channel assessment (CCA)/extended clear channel assessment (eCCA) is performed for channel monitoring and energy detection (ED), and transmission cannot be started before a channel is determined to be clear when its energy is lower than a specified threshold.

To reduce the number of LBT procedures, an SSB and remaining minimum system information (RMSI) are fused together to form a discovery reference signal (DRS) for transmission. In addition, to address the inability to transmit a DRS due to LBT failure, a DRS time window is introduced in a 5G unlicensed communications system, and the network device can start DRS transmission at any specified location within the DRS time window based on an LBT result.

Optionally, if the terminal device works in an unlicensed band, the determining a valid transmission occasion from transmission occasions of a random access message mentioned in step S102 of the foregoing embodiment may specifically include: if a transmission occasion of the random access message falls within a DRS time window, determining that the transmission occasion is a valid transmission occasion.

Specifically, for a transmission occasion of the random access message, if the transmission occasion overlaps or partially overlaps with the DRS time window in time domain, it is considered that the transmission occasion is an invalid transmission occasion.

Optionally, the determining a valid transmission occasion from transmission occasions of a random access message mentioned in step S102 of the foregoing embodiment may specifically include: if the terminal device works in an unlicensed band and the following preset conditions are met, determining that a transmission occasion of the random access message is a valid transmission occasion, where the preset conditions may include: in one slot, the transmission occasion of the random access message is not located before a third preset occasion, and a time gap between the transmission occasion of the random access message and the third preset occasion is greater than or equal to a second preset value; where the third preset occasion includes a candidate SSB or DRS occasion.

Optionally, the determining a valid transmission occasion from transmission occasions of a random access message mentioned in step S102 of the foregoing embodiment may specifically include: if the terminal device works in an unlicensed band and the following preset conditions are met, determining that a transmission occasion of the random access message is a valid transmission occasion, where the preset conditions may include: in one slot, the transmission occasion of the random access message is not located before a fourth preset occasion, and a time gap between the transmission occasion of the random access message and the fourth preset occasion is greater than or equal to a second preset value; where the fourth preset occasion includes an actual SSB or DRS occasion.

The first preset value and the second preset value mentioned in the foregoing several embodiments may be equal numerical values, or certainly, may be unequal numerical values.

Optionally, at least one of the first preset value or the second preset value is: (1) predefined; or (2) determined based on an uplink timing advance (TA) and a preset value. The following describes in detail the first preset value and the second preset value. It should be noted that $N_{gap}$ below may refer to the first preset value or the second preset value.

(1) $N_{gap}$ is predefined and associated with a subcarrier spacing (SCS). For details, refer to the following table.

| SCS | Value of $N_{gap}$ |
| --- | --- |
| Subcarrier spacing 1 | X |
| Subcarrier spacing 2 | Y |

(2) $N_{gap}$ is determined based on TA and a preset value $N_{gap,0}$:

(i) if the TA is 0, $N_{gap}=N_{gap,0}$; where for the preset value $N_{gap,0}$, reference may be made to the following table; and (ii) if the TA is not 0, $N_{gap}=N_{gap,0}+TA_{PUSCH}$; where $TA_{PUSCH}$ may be configured by a system information block (SIB) or a master information block (MIB); or $TA_{PUSCH}$ is a valid TA obtained on a historical occasion by the terminal device. For example, $TA_{PUSCH}$ is the latest valid TA value obtained by the terminal device in the last connected state.

| SCS | Value of $N_{gap, 0}$ |
| --- | --- |
| Subcarrier spacing 1 | X |
| Subcarrier spacing 2 | Y |

To describe in detail the method for determining a valid transmission occasion in the method for transmitting a random access message provided in some embodiments of this disclosure, the following describes a few specific embodiments.

In an embodiment, if the terminal device is configured with cell-specific TDD configuration information (that is, the first configuration information mentioned in the previous embodiments, which is cell-specific TDD configuration information), and the terminal device is not configured with UE-specific TDD configuration information (that is, the second configuration information mentioned in the previous embodiments, which is UE-specific TDD configuration information), the following cases 1 and 2 are introduced.

1. If a PUSCH transmission occasion is located in an uplink symbol indicated by the cell-specific TDD configuration information, the PUSCH transmission occasion is a valid transmission occasion.

Figure 2:
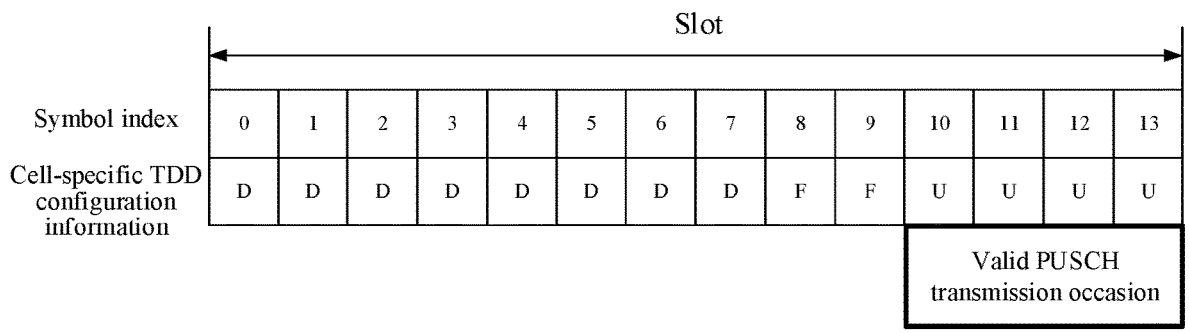
FIG. 2 to FIG. 12 are schematic diagrams of valid transmission occasions of a random access message according to several embodiments of this disclosure.
Figure 3:
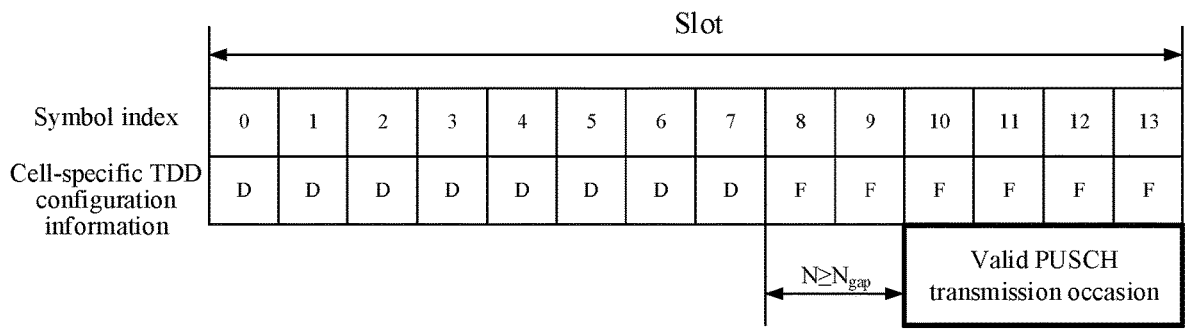

For details, refer to FIG. 2. Cell-specific TDD configuration information refers to a symbol format configured in the cell-specific TDD configuration information, including downlink symbols (D in the figure), uplink symbols (U in the figure), and flexible symbols (F in the figure).

In addition, as described in the previous embodiments, the transmission occasion of the random access message corresponds to at least one of a PRACH transmission occasion or a PUSCH transmission occasion. FIG. 2 and the subsequent embodiments are described only on the assumption that the transmission occasions of the random access message correspond to PUSCH transmission occasions. It can be understood that the embodiments shown in FIG. 2 to FIG. 12 are also applicable to the case in which the transmission occasions of the random access message correspond to PRACH transmission occasions, and the case in which the transmission occasions of the random access message correspond to PRACH transmission occasions and PUSCH transmission occasions. To avoid repetition, the applicable descriptions are omitted appropriately.

Figure 4:
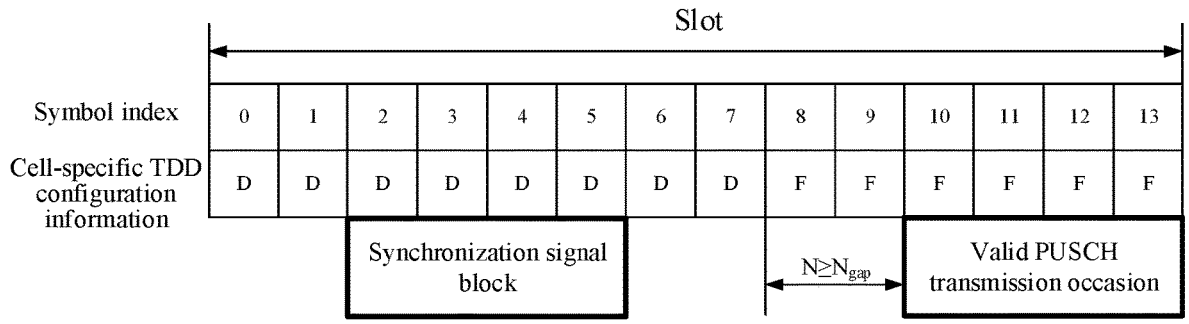

2. If a PUSCH transmission occasion is located in a flexible symbol indicated by the cell-specific TDD configuration information, 2.1. when the PUSCH transmission occasion is not located in a same slot as an SSB occasion, and a time gap between the PUSCH transmission occasion and a latest downlink symbol therebefore is greater than or equal to $N_{gap}$, the PUSCH transmission occasion is a valid transmission occasion, with details shown in FIG. 3; and 2.2. when the PUSCH transmission occasion is located in a same slot as a synchronization signal block (SSB) occasion, the PUSCH transmission occasion does not precede the SSB occasion (that is, being after the SSB occasion), and a time gap between the PUSCH transmission occasion and a previous downlink symbol (a downlink symbol indicated by the cell-specific TDD configuration information) or a previous SSB occasion (SSB transmission occasion) is greater than or equal to $N_{gap}$, the PUSCH transmission occasion is valid, as shown in FIG. 4.

Figure 5:
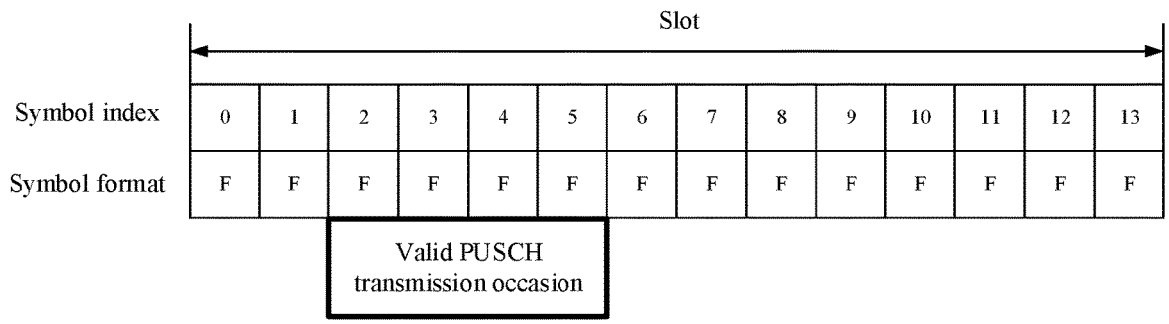
Figure 6:
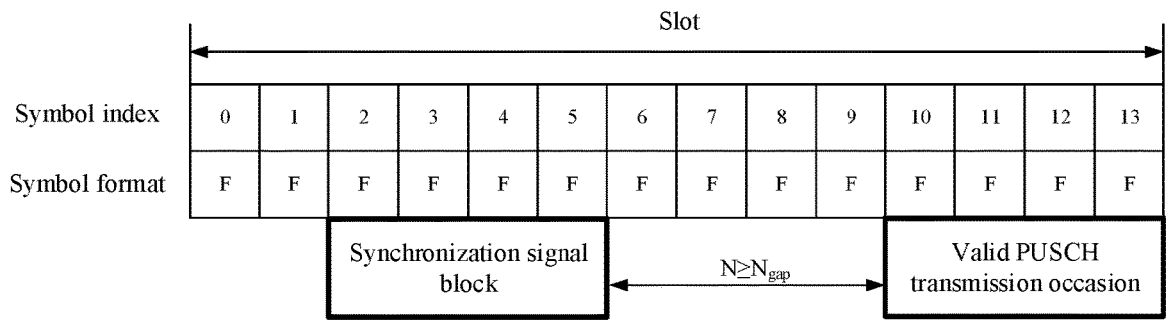

In another embodiment, the terminal device is configured with neither cell-specific TDD configuration information nor UE-specific TDD configuration information, in which case, 1. the terminal device considers all time domain locations to be flexible symbols;

2. when the PUSCH transmission occasion is not located in a same slot as an SSB occasion, the PUSCH transmission occasion is a valid transmission occasion, as shown in FIG. 5; and 3. when the PUSCH transmission occasion is located in a same slot as an SSB occasion, the PUSCH transmission occasion does not precede the SSB occasion (that is, being after the SSB occasion), and a time gap between the PUSCH transmission occasion and a previous SSB occasion (reception occasion) is greater than or equal to $N_{gap}$, the PUSCH transmission occasion is a valid transmission occasion, as shown in FIG. 6.

Figure 7:
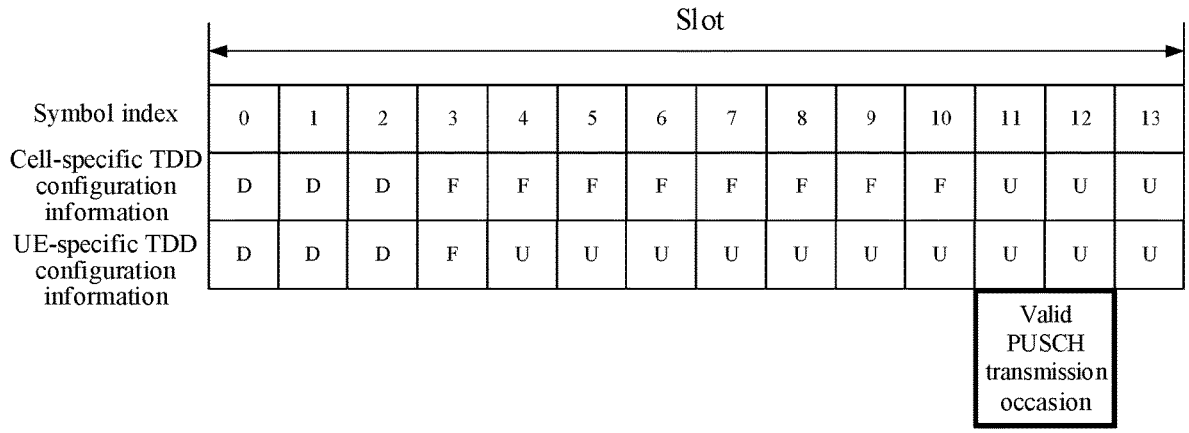
Figure 8:
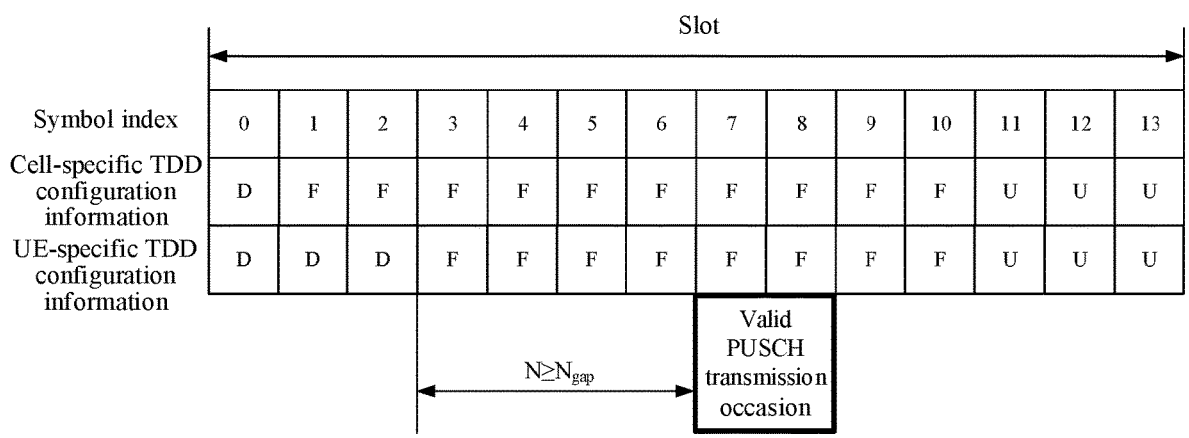
Figure 9:
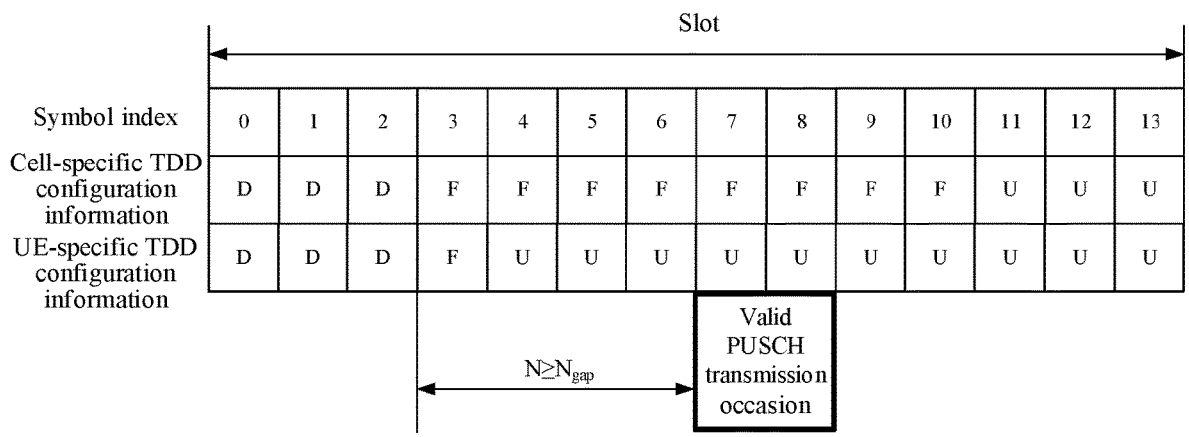
Figure 10:
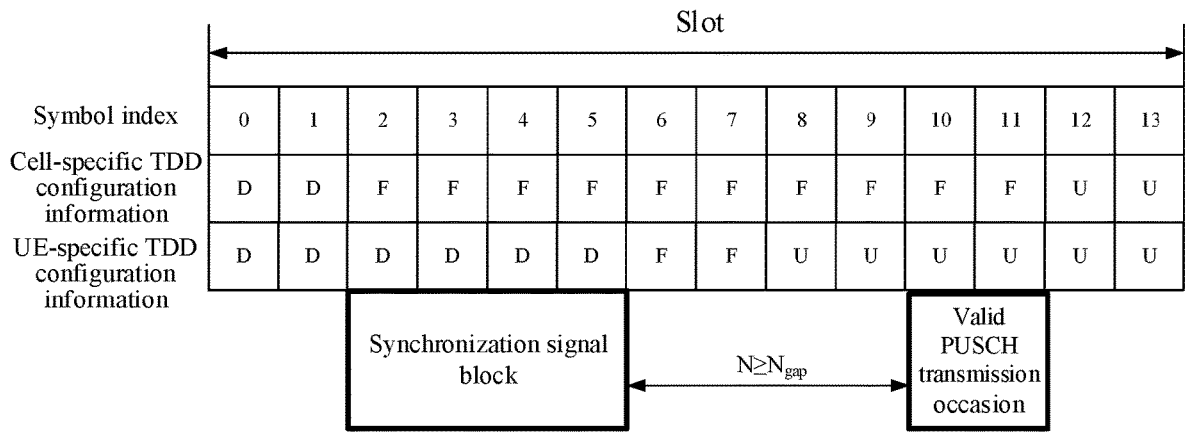

In another embodiment, the terminal device is configured with both cell-specific TDD configuration information and UE-specific TDD configuration information, in which case, 1. if a PUSCH transmission occasion is located in an uplink symbol indicated by the cell-specific TDD configuration information, the PUSCH transmission occasion is valid, as shown in FIG. 7, where symbol formats configured in the UE-specific TDD configuration information in FIG. 7 and subsequent figures include downlink symbols (D in the figure), uplink symbols (U in the figure), and flexible symbols (F in the figure);

2. if a PUSCH transmission occasion is located in a flexible symbol indicated by the cell-specific TDD configuration information, and if the PUSCH transmission occasion is located in a flexible symbol indicated by the UE-specific TDD configuration information (as shown in FIG. 8) or is located in an uplink symbol indicated by the UE-specific TDD configuration information (as shown in FIG. 9), 2.1. when the PUSCH transmission occasion is not located in a same slot as an SSB occasion, and a time gap between the PUSCH transmission occasion and a latest downlink symbol therebefore (a downlink symbol indicated by the cell-specific TDD configuration information or the UE-specific TDD configuration information) is greater than or equal to $N_{gap}$, the PUSCH transmission occasion is a valid transmission occasion; or 2.2. when the PUSCH transmission occasion is located in a same slot as an SSB occasion and the following conditions are met, the PUSCH transmission occasion is a valid transmission occasion, with details shown in FIG. 10. The conditions include:

(1) the PUSCH transmission occasion does not precede an SSB occasion, that is, the PUSCH transmission occasion follows the SSB occasion;

(2) a time gap between the PUSCH transmission occasion and a previous SSB occasion (transmission occasion) is greater than or equal to $N_{gap}$; and (3) a time gap between the PUSCH transmission occasion and a latest downlink symbol therebefore (the downlink symbol indicated by the Cell-specific TDD configuration information or the UE-specific TDD configuration information) is greater than or equal to $N_{gap}$.

Figure 11:
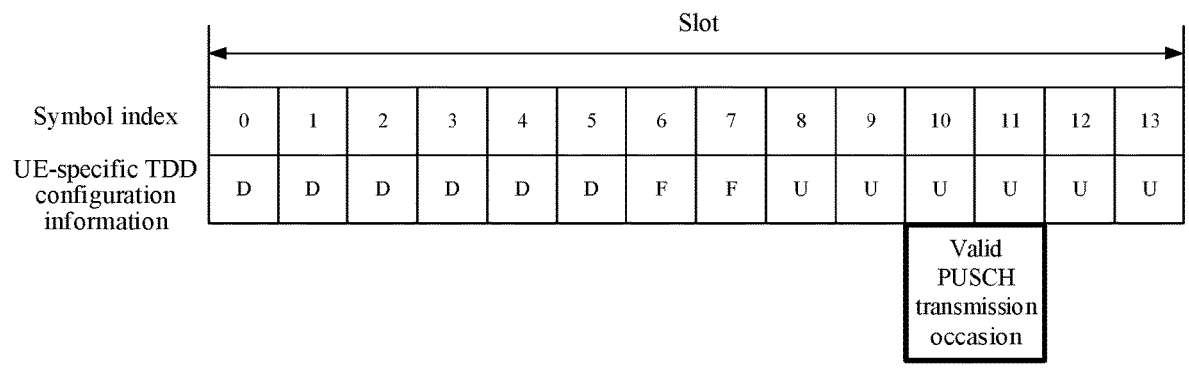
Figure 12:
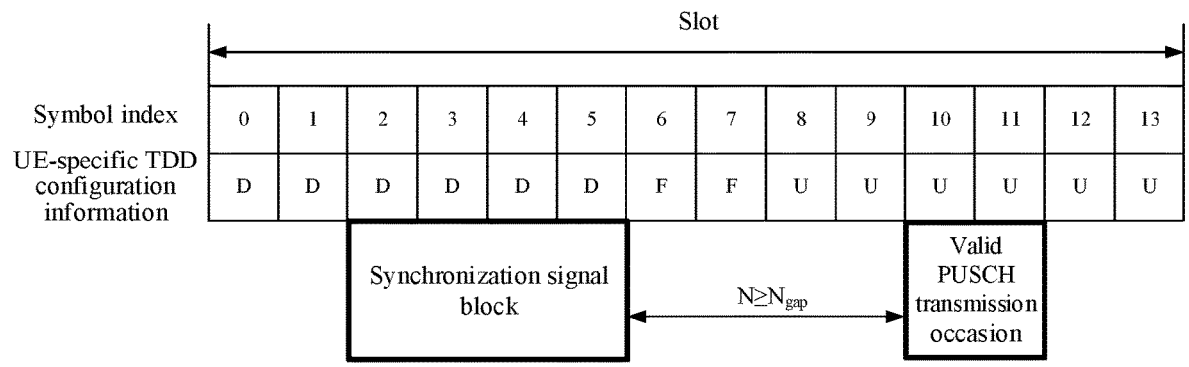

In a fourth embodiment:

The terminal device is not configured with cell-specific TDD configuration information (the terminal device assumes that all symbols are flexible symbols), the terminal device is configured with UE-specific TDD configuration information, and if a PUSCH transmission occasion is located in a flexible symbol or an uplink symbol indicated by the UE-specific TDD configuration information:

1. when the PUSCH transmission occasion is not located in a same slot as an SSB occasion, the PUSCH transmission occasion is a valid transmission occasion, as shown in FIG. 11; and 2. when the PUSCH transmission occasion is located in a same slot as an SSB occasion and the following conditions are met, the PUSCH transmission occasion is a valid transmission occasion, as shown in FIG. 12; and the conditions include:

(1) the PUSCH transmission occasion does not precede an SSB occasion, that is, the PUSCH transmission occasion follows the SSB occasion;

(2) a time gap between the PUSCH transmission occasion and a previous SSB occasion (transmission occasion) is greater than or equal to $N_{gap}$; and (3) a time gap between the PUSCH transmission occasion and a latest downlink symbol therebefore (a downlink symbol indicated by the UE-specific TDD configuration information) is greater than or equal to $N_{gap}$.

The foregoing describes in detail the method for transmitting a random access message according to some embodiments of this disclosure with reference to FIG. 1 to FIG. 12. A terminal device according to some embodiments of this disclosure is described below in detail with reference to FIG. 13.

Figure 13:
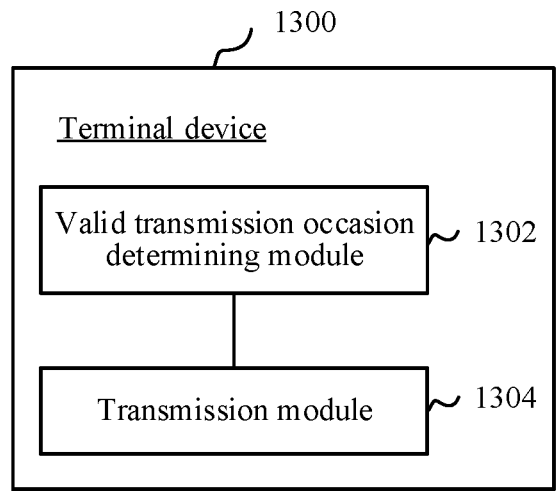
FIG. 13 is a schematic structural diagram of a terminal device according to an embodiment of this disclosure.

FIG. 13 is a schematic structural diagram of a terminal device according to some embodiments of this disclosure. As shown in FIG. 13, the terminal device 1300 includes:

a valid transmission occasion determining module 1302, configured to determine a valid transmission occasion from transmission occasions of a random access message, where the random access message corresponds to at least one of PRACH or PUSCH; and a transmission module 1304, configured to transmit the random access message on the valid transmission occasion.

In some embodiments of this disclosure, the valid transmission occasion is determined from the transmission occasions of the random access message. In this way, the random access message can later be transmitted on the determined valid transmission occasion, thereby preventing transmission of the random access message from interfering with downlink data, and improving communication effectiveness.

Optionally, in an embodiment, the foregoing transmission occasion of the random access message corresponds to at least one of a PRACH transmission occasion or a PUSCH transmission occasion.

Optionally, in an embodiment, the valid transmission occasion determining module 1302 may be specifically configured to determine the valid transmission occasion from the transmission occasions of a random access message based on at least one of a slot format indicated in first configuration information, a slot format indicated in second configuration information, or a synchronization signal block (SSB) occasion, where the first configuration information includes cell-specific time division duplex (TDD) configuration information, and the second configuration information includes UE-specific TDD configuration information.

Optionally, in an embodiment, the valid transmission occasion determining module 1302 may be specifically configured to: if a transmission occasion of the random access message is located in an uplink symbol indicated by first configuration information, determine that the transmission occasion is a valid transmission occasion, where the first configuration information comprises cell-specific TDD configuration information.

Optionally, in an embodiment, the valid transmission occasion determining module 1302 may be specifically configured to: if a transmission occasion of the random access message meets at least one of the following conditions, determine that the transmission occasion is a valid transmission occasion, where the preset conditions include:

in one slot, the transmission occasion does not precede an SSB occasion;

a time gap between the transmission occasion and a first preset occasion is greater than or equal to a first preset value, where the first preset occasion is a time domain location of a latest downlink symbol before the transmission occasion; and a time gap between the transmission occasion and a second preset occasion is greater than or equal to a first preset value, where the second preset occasion is a latest SSB occasion before the transmission occasion.

Optionally, in an embodiment, the valid transmission occasion determining module 1302 may be specifically configured to: if a transmission occasion of the random access message is located in an uplink symbol or a flexible symbol indicated by second configuration information and meets at least one of the preset conditions, determine that the transmission occasion is a valid transmission occasion, where the second configuration information includes UE-specific TDD configuration information.

Optionally, in an embodiment, the valid transmission occasion determining module 1302 may be specifically configured to: if the terminal device works in an unlicensed band and a transmission occasion of the random access message falls within a discovery reference signal (DRS) time window, determine that the transmission occasion is an invalid transmission occasion.

Optionally, in an embodiment, the valid transmission occasion determining module 1302 may be specifically configured to: if the terminal device works in an unlicensed band and preset conditions are met, determine that a transmission occasion of the random access message is a valid transmission occasion, where the preset conditions include:

in one slot, the transmission occasion of the random access message does not precede a third preset occasion; and a time gap between the transmission occasion of the random access message and the third preset occasion is greater than or equal to a second preset value; where the third preset occasion includes a candidate SSB or DRS occasion.

Optionally, in an embodiment, the valid transmission occasion determining module 1302 may be specifically configured to: if the terminal device works in an unlicensed band and preset conditions are met, determine that a transmission occasion of the random access message is a valid transmission occasion, where the preset conditions include:

in one slot, the transmission occasion of the random access message does not precede a fourth preset occasion; and a time gap between the transmission occasion of the random access message and the fourth preset occasion is greater than or equal to a second preset value; where the fourth preset occasion includes an actual SSB or DRS occasion.

Optionally, in an embodiment, at least one of the first preset value or the second preset value is: predefined; or determined based on an uplink timing advance TA and a preset value.

Optionally, in an embodiment, the TA is configured by a system information block (SIB) or a master information block (MIB); or the TA is a valid TA obtained on a historical occasion by the terminal device.

For the terminal device 1300 according to some embodiments of this disclosure, reference may be made to the procedure of the method 100 corresponding to some embodiments of this disclosure. In addition, the units or modules in the terminal device 1300 and the foregoing other operations and/or functions are respectively intended to implement the corresponding procedures in the method 100, and details are not repeated herein for brevity.

Figure 14:
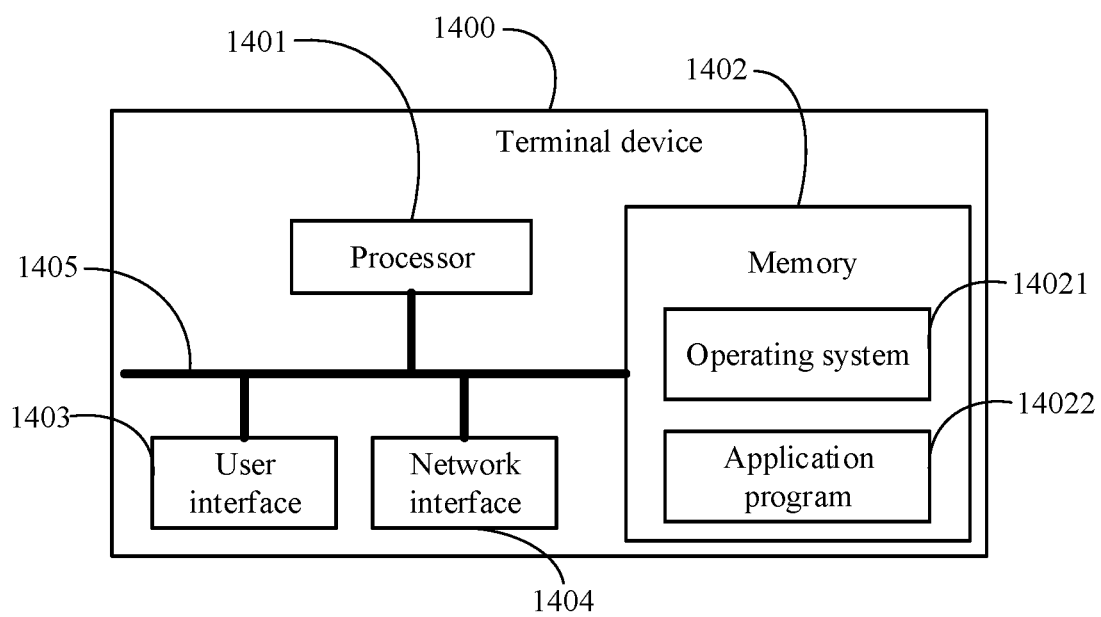
FIG. 14 is a schematic structural diagram of a terminal device according to another embodiment of this disclosure.

FIG. 14 is a block diagram of a terminal device according to another embodiment of this disclosure. The terminal device 1400 shown in FIG. 14 includes at least one processor 1401, a memory 1402, at least one network interface 1404, and a user interface 1403. The components in the terminal device 1400 are coupled together through a bus system 1405. It can be understood that the bus system 1405 is configured to implement connection and communication between these components. In addition to a data bus, the bus system 1405 further includes a power bus, a control bus, and a status signal bus. However, for clarity of description, various buses are marked as the bus system 1405 in FIG. 14.

The user interface 1403 may include a display, a keyboard, or a pointing device (for example, a mouse or a trackball), a touch panel, or a touchscreen.

It may be understood that the memory 1402 in some embodiments of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. By way of example but not restrictive description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DRRAM). The memory 1402 of the system and the method described in some embodiments of this disclosure is intended to include but not be limited to these and any other applicable types of memories.

In some implementations, the memory 1402 stores the following elements: executable modules or data structures, or a subset thereof, or an extended set thereof: an operating system 14021 and an application program 14022.

The operating system 14021 includes various system programs, such as a framework layer, a core library layer, and a driver layer, for implementing various basic services and processing hardware-based tasks. The application program 14022 includes various application programs, such as a media player and a browser, which are used to implement various application services. A program for implementing the method in some embodiments of this disclosure may be included in the application program 14022.

In some embodiments of this disclosure, the terminal device 1400 further includes a program stored in the memory 1402 and capable of running on the processor 1401. When the program is executed by the processor 1401, the steps of the method 100 are implemented.

The foregoing method disclosed by some embodiments of this disclosure may be applied to the processor 1401, or implemented by the processor 1401. The processor 1401 may be an integrated circuit chip, having a signal processing capability. During implementation, the steps of the foregoing method may be completed by hardware integrated logic circuits in the processor 1401 or instructions in the form of software. The foregoing processor 1401 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in some embodiments of this disclosure. The general-purpose processor may be a microprocessor, or the processor may be any conventional processor or the like. Steps of the methods disclosed with reference to some embodiments of this disclosure may be directly performed and completed by using a hardware decoding processor, or may be performed and completed by using a combination of hardware and a software module in a decoding processor. The software module may be located in a computer readable storage medium that is mature in the art, such as a random access memory, a flash memory, a read-only memory, a programmable read-only memory or electrically erasable programmable memory, or a register. The computer-readable storage medium is located in the memory 1402, and the processor 1401 fetches information in the memory 1402, and completes the steps of the foregoing method in combination with its hardware. Specifically, the computer-readable storage medium stores a computer program, and when the computer program is executed by the processor 1401, the steps in the foregoing method 100 are implemented.

It can be understood that the embodiments described in this disclosure may be implemented by hardware, software, firmware, middleware, microcode, or a combination thereof. In implementation by hardware, a processing unit may be implemented in one or more application-specific integrated circuits (ASIC), digital signal processors (DSP), digital signal processing devices (DSP Device, DSPD), programmable logic devices (PLD), field programmable gate arrays (FPGA), general-purpose processors, controllers, microcontrollers, microprocessors, other electronic units used to implement the functions described in this disclosure, or a combination thereof.

For software implementation, the techniques described in some embodiments of this disclosure may be implemented by modules (for example, processes and functions) that perform the functions described in some embodiments of this disclosure. Software code may be stored in the memory and executed by the processor. The memory may be implemented in or outside the processor.

The terminal device 1400 can implement the processes implemented by the terminal device in the foregoing embodiments. To avoid repetition, details are not described herein again.

Some embodiments of this disclosure further provide a computer-readable storage medium that stores a computer program. When the computer program is executed by a processor, the processes of the foregoing method embodiment 100 can be implemented, with the same technical effects achieved. To avoid repetition, details are not described herein again. For example, the computer-readable storage medium is a read-only memory (ROM for short), a random access memory (RAM for short), a magnetic disk, an optical disc, or the like.

It should be noted that the terms "comprise", "include", or any of their variants in this specification are intended to cover a non-exclusive inclusion, such that a process, method, article, or apparatus that includes a list of elements includes not only those elements but also other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software on a necessary universal hardware platform or by hardware only. In most cases, the former is a more preferred implementation though. Based on such an understanding, the technical solutions of this disclosure essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

Therefore, the objective of this disclosure may also be achieved by running a program or a group of programs on any computing apparatus. The computing apparatus may be a general apparatus of common sense. Therefore, the objective of this disclosure may also be achieved by merely providing a program product including program code for implementing the method or apparatus. Therefore, such program product also constitutes this disclosure, and a storage medium storing such program product also constitutes this disclosure. Apparently, the storage medium may be any storage medium of common sense or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in time sequence following the order of description, but are not necessarily performed in time sequence. Some steps may be performed in parallel or separate from each other.

The foregoing describes the embodiments of this disclosure with reference to the accompanying drawings. However, this disclosure is not limited to the foregoing specific implementations. The foregoing specific implementations are merely illustrative rather than restrictive. Inspired by this disclosure, persons of ordinary skill in the art may develop many other forms without departing from the principle of this disclosure and the protection scope of the claims, and all such forms fall within the protection scope of this disclosure.

What is claimed is:

1. A method for transmitting a random access message, executed by a terminal device and comprising:
    determining a valid transmission occasion from transmission occasions of a random access message, wherein the random access message corresponds to at least one of physical random access channel (PRACH) or physical uplink shared channel (PUSCH); and
    transmitting the random access message on the valid transmission occasion;
    wherein the transmission occasion corresponds to a PRACH transmission occasion and a PUSCH transmission occasion;
    wherein the determining a valid transmission occasion from transmission occasions of a random access message comprises:
    determining the valid transmission occasion from the transmission occasions of the random access message based on a slot format indicated in first configuration information, or a slot format indicated in second configuration information, wherein
    the first configuration information comprises cell-specific time division duplex (TDD) configuration information; and
    the second configuration information comprises UE-specific TDD configuration information;
    wherein the determining a valid transmission occasion from transmission occasions of a random access message comprises:
    when a transmission occasion of the random access message meets the following preset conditions, determining that the transmission occasion is a valid transmission occasion, wherein
    the preset conditions comprise:
    in one slot, the transmission occasion does not precede an SSB occasion;
    a time gap between the transmission occasion and a first preset occasion is greater than or equal to a first preset value, wherein the first preset occasion is a time domain location of a latest downlink symbol before the transmission occasion; and
    a time gap between the transmission occasion and a second preset occasion is greater than or equal to a first preset value, wherein the second preset occasion is a latest SSB occasion before the transmission occasion.

2. The method according to claim 1, wherein the determining a valid transmission occasion from transmission occasions of a random access message comprises:
    if a transmission occasion of the random access message is located in an uplink symbol indicated by first configuration information, determining that the transmission occasion is a valid transmission occasion, wherein the first configuration information comprises cell-specific TDD configuration information.

3. The method according to claim 1, wherein when the transmission occasion of the random access message meets the preset conditions, determining that the transmission occasion is a valid transmission occasion comprises:
    if the transmission occasion of the random access message is located in an uplink symbol or a flexible symbol indicated by second configuration information and meets at least one of the preset conditions, determining that the transmission occasion is a valid transmission occasion, wherein
    the second configuration information comprises UE-specific TDD configuration information.

4. The method according to claim 1, wherein the determining a valid transmission occasion from transmission occasions of a random access message further comprises:
if the terminal device works in an unlicensed band and a transmission occasion of the random access message falls within a discovery reference signal (DRS) time window, determining that the transmission occasion is an invalid transmission occasion.

5. The method according to claim 1, wherein the determining a valid transmission occasion from transmission occasions of a random access message comprises:
if the terminal device works in an unlicensed band and preset conditions are met, determining that a transmission occasion of the random access message is a valid transmission occasion, wherein
the preset conditions comprise:
in one slot, the transmission occasion of the random access message does not precede a third preset occasion; and
a time gap between the transmission occasion of the random access message and the third preset occasion is greater than or equal to a second preset value; wherein
the third preset occasion comprises a candidate SSB or DRS occasion.

6. The method according to claim 1, wherein the determining a valid transmission occasion from transmission occasions of a random access message comprises:
if the terminal device works in an unlicensed band and preset conditions are met, determining that a transmission occasion of the random access message is a valid transmission occasion, wherein
the preset conditions comprise:
in one slot, the transmission occasion of the random access message does not precede a fourth preset occasion; and
a time gap between the transmission occasion of the random access message and the fourth preset occasion is greater than or equal to a second preset value; wherein
the fourth preset occasion comprises an actual SSB or DRS occasion.

7. A terminal device, comprising a memory, a processor, and a program stored in the memory and capable of running on the processor, wherein when the program is executed by the processor, the following steps are implemented:
determining a valid transmission occasion from transmission occasions of a random access message, wherein the random access message corresponds to at least one of physical random access channel (PRACH) or physical uplink shared channel (PUSCH); and
transmitting the random access message on the valid transmission occasion;
wherein the transmission occasion corresponds to a PRACH transmission occasion and a PUSCH transmission occasion;
wherein the determining a valid transmission occasion from transmission occasions of a random access message comprises:
determining the valid transmission occasion from the transmission occasions of the random access message based on a slot format indicated in first configuration information, or a slot format indicated in second configuration information, wherein
the first configuration information comprises cell-specific time division duplex (TDD) configuration information; and
the second configuration information comprises UE-specific TDD configuration information;
wherein the determining a valid transmission occasion from transmission occasions of a random access message comprises:
when a transmission occasion of the random access message meets the following preset conditions, determining that the transmission occasion is a valid transmission occasion, wherein
the preset conditions comprise:
in one slot, the transmission occasion does not precede an SSB occasion;
a time gap between the transmission occasion and a first preset occasion is greater than or equal to a first preset value, wherein the first preset occasion is a time domain location of a latest downlink symbol before the transmission occasion; and
a time gap between the transmission occasion and a second preset occasion is greater than or equal to a first preset value, wherein the second preset occasion is a latest SSB occasion before the transmission occasion.

8. The terminal device according to claim 7, wherein the determining a valid transmission occasion from transmission occasions of a random access message comprises:
determining the valid transmission occasion from the transmission occasions of the random access message based on at least one of a slot format indicated in first configuration information, a slot format indicated in second configuration information, or a synchronization signal block (SSB) occasion, wherein
the first configuration information comprises cell-specific time division duplex (TDD) configuration information; and
the second configuration information comprises UE-specific TDD configuration information.

9. The terminal device according to claim 7, wherein the determining a valid transmission occasion from transmission occasions of a random access message comprises:
if a transmission occasion of the random access message is located in an uplink symbol indicated by first configuration information, determining that the transmission occasion is a valid transmission occasion, wherein
the first configuration information comprises cell-specific TDD configuration information.

10. The terminal device according to claim 7, wherein when the transmission occasion of the random access message meets the preset conditions, determining that the transmission occasion is a valid transmission occasion comprises:
if the transmission occasion of the random access message is located in an uplink symbol or a flexible symbol indicated by second configuration information and meets at least one of the preset conditions, determining that the transmission occasion is a valid transmission occasion, wherein
the second configuration information comprises UE-specific TDD configuration information.

11. A non-transitory computer readable storage medium, wherein the computer readable storage medium stores a computer program, and when the computer program is executed by a processor, the following steps are implemented:
determining a valid transmission occasion from transmission occasions of a random access message, wherein the random access message corresponds to at least one of physical random access channel (PRACH) or physical uplink shared channel (PUSCH); and transmitting the random access message on the valid transmission occasion;
wherein the transmission occasion corresponds to a PRACH transmission occasion and a PUSCH transmission occasion;
wherein the determining a valid transmission occasion from transmission occasions of a random access message comprises:
determining the valid transmission occasion from the transmission occasions of the random access message based on a slot format indicated in first configuration information, or a slot format indicated in second configuration information, wherein
the first configuration information comprises cell-specific time division duplex (TDD) configuration information; and
the second configuration information comprises UE-specific TDD configuration information;
wherein the determining a valid transmission occasion from transmission occasions of a random access message comprises:
when a transmission occasion of the random access message meets the following preset conditions, determining that the transmission occasion is a valid transmission occasion, wherein the preset conditions comprise:
in one slot, the transmission occasion does not precede an SSB occasion;
a time gap between the transmission occasion and a first preset occasion is greater than or equal to a first preset value, wherein the first preset occasion is a time domain location of a latest downlink symbol before the transmission occasion; and
a time gap between the transmission occasion and a second preset occasion is greater than or equal to a first preset value, wherein the second preset occasion is a latest SSB occasion before the transmission occasion.

12. The computer readable storage medium according to claim 11, wherein the determining a valid transmission occasion from transmission occasions of a random access message comprises:
if a transmission occasion of the random access message is located in an uplink symbol indicated by first configuration information, determining that the transmission occasion is a valid transmission occasion, wherein the first configuration information comprises cell-specific TDD configuration information.

* * * * *